United States Patent
Kawano et al.

(10) Patent No.: US 6,826,703 B2
(45) Date of Patent: Nov. 30, 2004

(54) SYSTEM FOR NOTIFYING OPERATING SYSTEM OF ADDITIONAL EVENT FOR RESTORING SUSPEND MODE AFTER A HARDWARE DEVICE EVENT SWITCHES COMPUTER TO NORMAL MODE

(75) Inventors: Seiichi Kawano, Sagamihara (JP); Takashi Inui, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 729 days.

(21) Appl. No.: 09/771,395

(22) Filed: Jan. 26, 2001

(65) Prior Publication Data
US 2001/0020268 A1 Sep. 6, 2001

(30) Foreign Application Priority Data
Jan. 26, 2000 (JP) ........................................ 2000-017605

(51) Int. Cl.[7] ................................................ G06F 1/26
(52) U.S. Cl. ...................... 713/320; 710/303; 719/318
(58) Field of Search ............................... 713/320, 300; 710/303; 719/318

(56) References Cited

U.S. PATENT DOCUMENTS

| | | | | |
|---|---|---|---|---|
| 5,638,541 A | * | 6/1997 | Sadashivaiah | 713/323 |
| 5,948,074 A | * | 9/1999 | Ninomiya | 710/2 |
| 6,105,142 A | * | 8/2000 | Goff et al. | 713/324 |
| 6,219,742 B1 | * | 4/2001 | Stanley | 710/260 |
| 6,446,213 B1 | * | 9/2002 | Yamaki | 713/300 |

OTHER PUBLICATIONS

"Advanced Configuration and Power Interface Specification", by Intel, Microsoft, and Toshiba, Revision 1.0b, Feb. 2, 1999.*

* cited by examiner

Primary Examiner—Thomas Lee
Assistant Examiner—Albert Wang
(74) Attorney, Agent, or Firm—Derek S. Jennings

(57) ABSTRACT

The method for controlling a computer that notifies an operating system of a request event corresponding to a device event from hardware. A device event may be generated, for example by a user operating a keyboard or mouse connected to the computer. That is, the device event occurs when a certain event is provided to the hardware of the computer. A request event causes a process corresponding to the device event to be performed under the control of an operating system. Then a response event from the operating system caused by the notification of the request event is accepted and a process event corresponding to the accepted response event is output to the hardware.

18 Claims, 4 Drawing Sheets

[Figure 1]
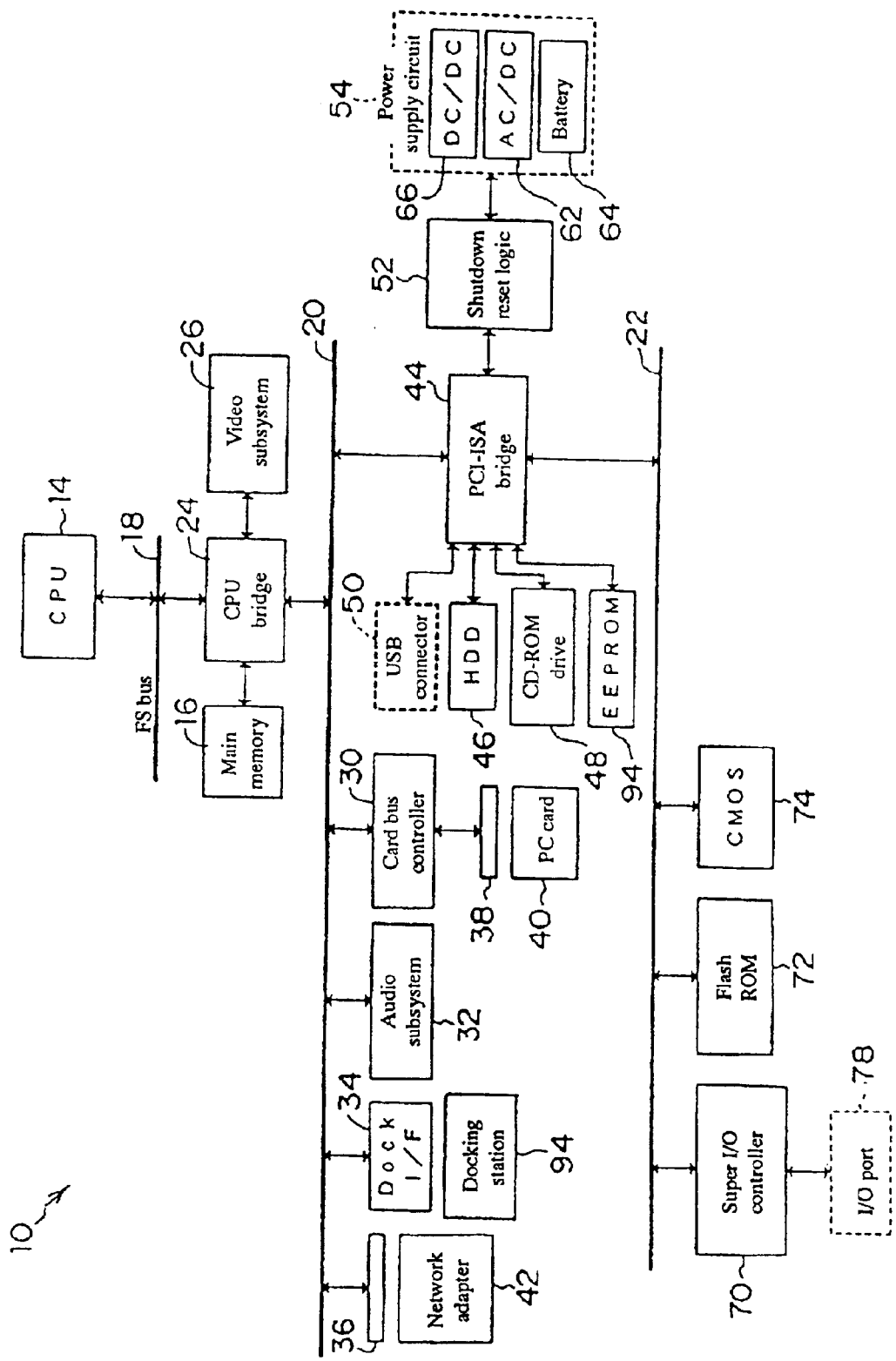

[Figure 2]
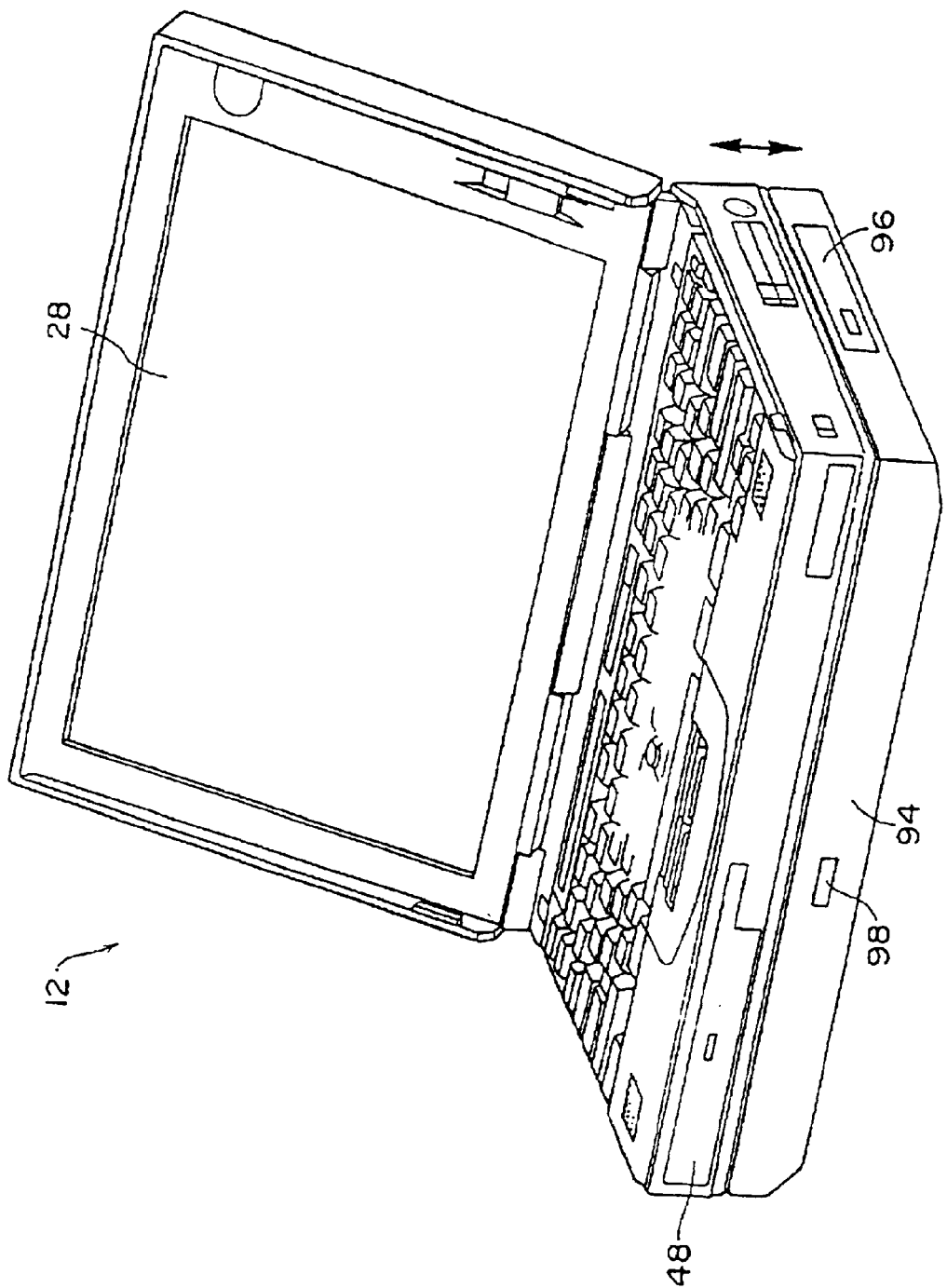

[Figure 3]
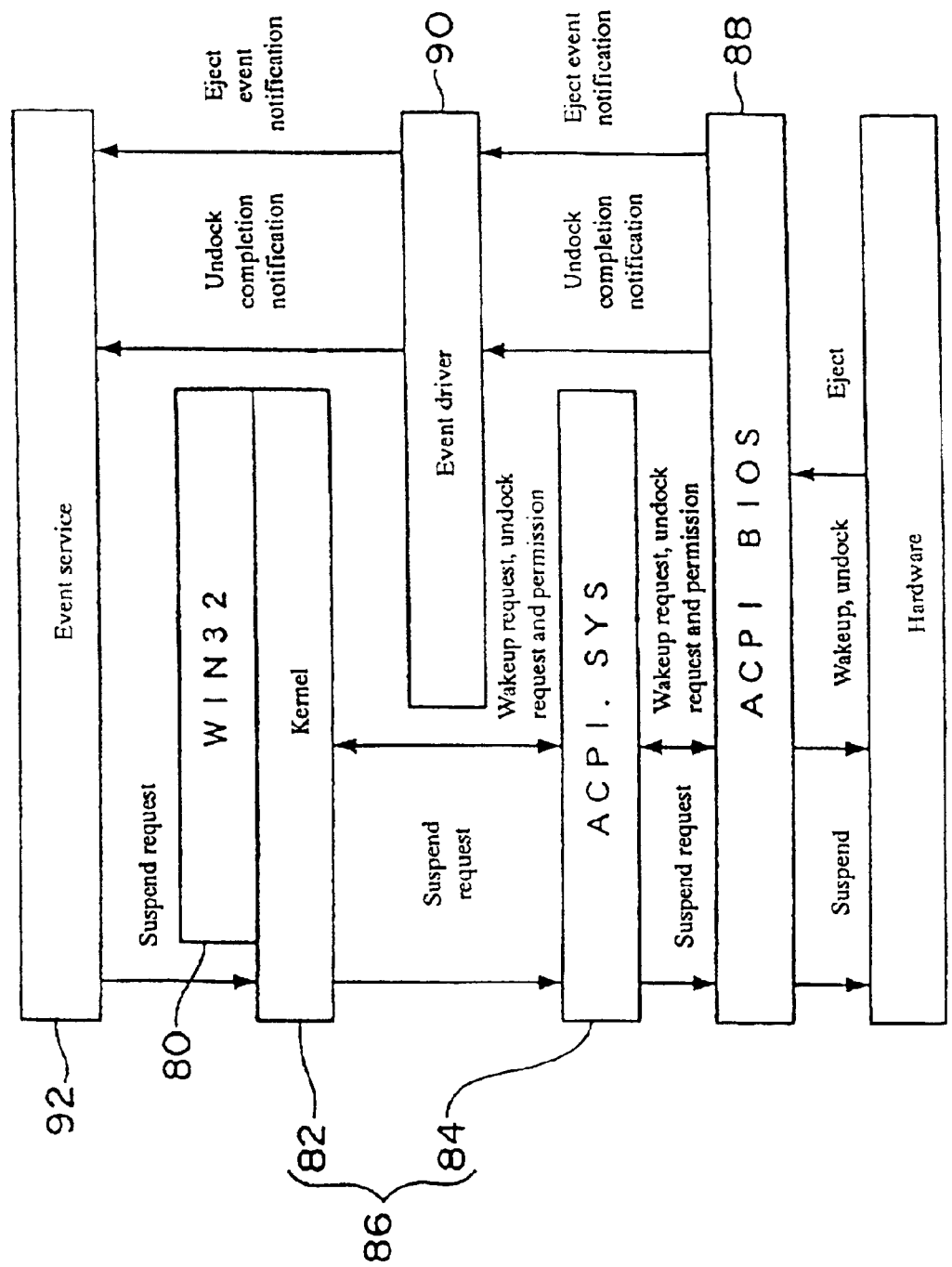

[Figure 4]
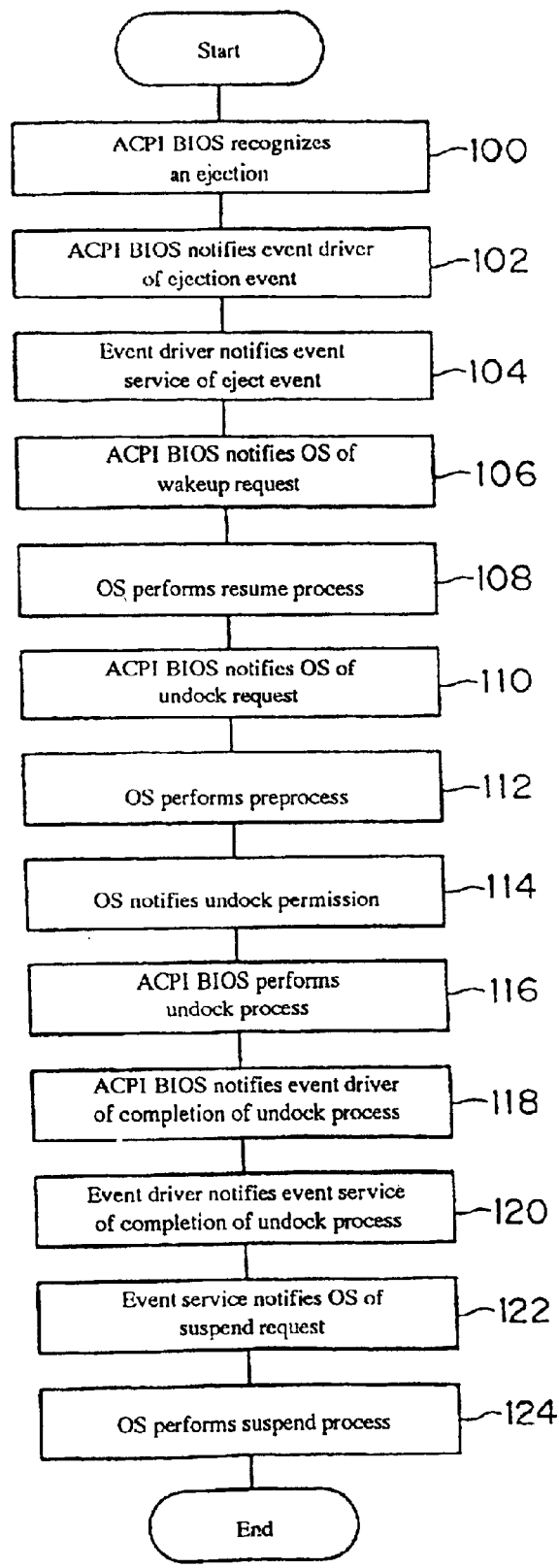

SYSTEM FOR NOTIFYING OPERATING SYSTEM OF ADDITIONAL EVENT FOR RESTORING SUSPEND MODE AFTER A HARDWARE DEVICE EVENT SWITCHES COMPUTER TO NORMAL MODE

FIELD OF THE INVENTION

The present invention relates to a method for controlling a computer and a recording medium, and in particular to a method for controlling a computer and a recording medium that allows an operating system to control electronic power or the like on the computer.

BACKGROUND OF THE INVENTION

Conventionally, power management of a personal computer (PC) has been performed by an Advanced Power Management (APM), for example. In recent years, a standard called an "Advanced Configuration and Power Interface" (ACPI), which allows such a function to be performed mainly by an operating system (OS), has become known.

The ACPI allows the OS to monitor the usage of a system including the PC and peripheral devices and select devices and services that are not required by the user or an application to shut down them because the OS can directly control the power management and plug-and-play functions.

However, because only those events that are defined in the ACPI standard can be handled in the ACPI environment and standard processes for those events are predefined, it is difficult to perform a special process for a system-specific event.

For example, when a user depresses an eject button on the docking station, which contains a hard disk drive and other components, of a notebook PC in suspend mode (a state after an operation status is stored and power to peripheral devices is shut off) with the docking station being attached to it to detach the PC from the docking station (undocking), a process should be performed by the OS for bringing the system into a state in which the undock can be permitted before permitting the user to undock the PC. To accomplish this, the system is activated (resumed) and an undock request defined in the ACPI standard is issued by the ACPI BIOS to the OS to cause the OS to perform a process for the undock request.

Although the user's intent is to detach the PC from the docking station with the PC in suspend mode rather than resuming the operation of the PC, the PC remains resuming operation because the ACPI standard defines no process for restoring the PC to the suspend mode after it is undocked. Thus, there is a problem that the occurrence of a system-specific event that the PC is detached from the docking station leads to a result different from a user's intent.

The present invention has been achieved in light of the above-mentioned fact and it is an object of the present invention to provide a method for controlling a computer and a recording medium that allow a process that is not defined in a standard when a system-specific event occurs

SUMMARY OF THE INVENTION

To attain the above-mentioned object, a first feature of the present invention is a method for controlling a computer that notifies an operating system of a request event corresponding to a device event from hardware. A device event may be generated, for example by a user operating a keyboard or mouse connected to the computer. That is, the device event occurs when a certain event is provided to the hardware of the computer. A request event causes a process corresponding to the device event to be performed under the control of an operating system. Then a response event from the operating system caused by the notification of the request event is accepted and a process event corresponding to the accepted response event is output to the hardware.

The operating system knows the occurrence of the device event by receiving the notification of the request event and outputs the response event for causing a process corresponding to the device event to be performed. The process event is a process corresponding to the response event, that is, a process corresponding to the device event. The process corresponding to the device event is predefined in a standard used by the computer, for example. The above-described process can be performed by a basic system configured so as to comprise a BIOS, for example.

After the basic system accepts the response event, it notifies the operating system of an additional event associated with the response event. The additional event is an event for causing a process other than the predefined process corresponding to the device event to be performed. Thus, the operating system is notified of a plurality of events for the occurrence of a single device event. An additional response event corresponding to the additional event from the operating system is accepted and the additional process event corresponding to the accepted additional response event is further output to the hardware.

Thereby, because a process, which is not predefined, is allowed to be performed in this way if a system-specific event occurs in a system including a computer, the process just as the user intended can be achieved.

In addition, in the basic system, after a response event is accepted and a process event is output, the notification and acceptance of an intermediate event may be performed then an additional event associated with the response event may be notified to the operating system.

Another feature of the present invention is a computer comprises a basic system for notifying an operating system of a request event corresponding to a device event in response to the device event from hardware, accepting a response event of the operating system caused by the notification, and outputting a process event corresponding to the accepted response event to the hardware. The basic system comprises a notifier for notifying the operating system of an additional event associated with the response event after receiving the response event, an acceptor for accepting an additional response event corresponding to the additional event from the operating system, and an output for outputting an additional process event corresponding to the accepted additional response event to the hardware. Thus, a process matching a user's intent can be performed even if an event that is specific to a system, including a computer, is generated.

Another feature of the present invention is a recording medium that contains a program for controlling a computer for a device event provided from hardware in the computer comprising a basic system for notifying an operating system of a request event corresponding to the device event in response to the device event from the hardware, accepting a response event of the operating system caused by the notification, and outputting a process event corresponding to the accepted response event to the hardware. Provided is a program comprising the steps of: notifying the operating system of an additional event associated with the response event after receiving the response event in the basic system;

accepting an additional response event corresponding to the additional event from the operating system; and further outputting an additional process event corresponding to the accepted additional response event to the hardware; thereby allowing the computer to perform a process that is not predefined if an event that is specific to a system, including the computer, is generated.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF THE DRAWINGS

FIG. 1 is a block diagram showing a general configuration of a computer system according to an embodiment of the present invention.

FIG. 2 shows a perspective view of a notebook PC.

FIG. 3 shows a block diagram of the computer system.

FIG. 4 is a flowchart showing a control flow in the computer system.

DETAIL DESCRIPTION OF THE INVENTION

Furthermore, the basic system may be a system conforming to the ACPI standard. This allows the power management of the computer to be performed under the control of the operating system.

The device event therefore may be, for example, an attach/detach event generated when the attachment/detachment of a peripheral device is indicated to hardware during energy-saving mode of the computer.

The energy-saving mode may be, for example, a mode during which an operation status is stored in memory and power to a peripheral device is shut off. A computer is switched from normal mode to energy-saving mode after it is not manipulated for a certain period of time. The peripheral device may be a docking station for expanding capabilities of a notebook computer, and an external memory device such as a CD-ROM drive and a DVD-ROM drive, for example. When the attachment/detachment of such a peripheral device is indicated during energy-saving mode, a process event may be provided for switching the computer from energy-saving mode to normal mode and allowing for attachment/detachment of the peripheral device. Thus, when the attachment/detachment of a peripheral device is indicated, the attachment/detachment is not straightforwardly permitted. Instead, the computer is switched to normal mode to perform a required process before permitting the attachment/detachment, thereby preventing inconsistency of the system.

If the attachment/detachment of a peripheral device is indicated by the user, all that is needed is to allow for the attachment/detachment of the peripheral. It would not match the user's intention if the computer switched from energy-saving mode to normal mode and remained in normal mode.

Therefore, an additional event is output for switching the computer from normal mode to energy-saving mode after a regular process ends. This can restore the computer to the state before the event was generated, achieving the compliance with the user's intention.

The basic system may notify the operating system of a request event as well as a second request event associated with the request event, accept the second request, notify the operating system of an intermediate event after accepting the response event and outputting the process event, accept the intermediate event, and notify the operating system of an additional event associated with the response event. That is, because the process event can be monitored by notifying the operating system of the second request event, the additional process event can be output after making sure that the process event is output.

Furthermore, the basic system may further comprise a second notifier for performing the notification of an intermediate event, and a second acceptor for accepting an intermediate event after accepting the response event and outputting the process event.

The device event may be an attach/detach event generated when the attachment/detachment of a peripheral device is indicated to the hardware during an energy-saving mode of the computer, the process event may be an event for switching the computer from the energy-saving mode to a normal mode and allowing the peripheral device to be attached/detached, and the additional process event may be an event for switching the computer from the normal mode to the energy-saving mode after the process event is output. Thus, if the attachment/detachment of a peripheral device is indicated during energy-saving mode, the computer allows the peripheral device to be attached/detached to/from the computer and then returns from normal mode to energy-saving mode to match the user's intention.

The basic system may comprise a third notifier for notifying the operating system of a second request event associated with the request event as well as the request event and a monitor for accepting the second request event and monitoring the process event.

The recording medium may contain a program for causing the basic system to perform the notification of an intermediate event after accepting the response event and outputting the process event; accept the intermediate event; and notify the operating system of an additional event associated with the response event.

The recording medium may contain a program for causing the basic system to operate as a system conforming to the ACPI standard.

The recording medium may contain a program provided for the case where the device event is an attach/detach event, which is generated when the attachment/detachment of a peripheral device is indicated to the hardware during energy-saving mode of the computer. The process event is an event for switching the computer from the energy-saving mode to normal mode and allowing the peripheral device to be attached/detached. The additional process event is an event for switching the computer from the normal mode to the energy-saving mode after the process event is output.

The recording medium may contain a program causing the basic system to notify the operating system of a second request event associated with the request event as well as the request event; accept the second request event and monitor the process event; notify the operating system of an intermediate event after accepting the response event and outputting the process event; accept the intermediate event; and notify the operating system of an additional event associated with the response event.

The recording medium may be any of various recording media, including CD-ROM, DVD-ROM, a floppy disk, and a memory card. Installing the program contained in the recording medium into a computer to which the present invention is not applied can easily upgrade the computer to one to which the present invention is applied.

An exemplary embodiment of the present invention will be described below with reference to the accompanying drawings. FIG. 1 schematically shows subsystems in a hardware configuration of a computer system 10 comprised of a typical personal computer (PC) suitable for implementing the present invention. One example of the PC for implementing the present invention may be a notebook PC 12 (shown in FIG. 2) conforming to the PC Open Architecture Developer's Group (OADG) specifications and running "Windows 98" or "NT" from Microsoft Corporation as its operating system (OS). Each component of the computer system 10 will be described below.

A central processing unit (CPU) 14, which is the brain of the entire computer system 10, executes various programs under the control of the OS. The CPU 14 may be "Pentium", "MMX technology Pentium", or "Pentium Pro" from Intel Corporation, or other CPU from other manufacturers such as AMD or the like or "PowerPC" from IBM. The CPU 14 comprises an L2 (Level 2) cache, which is a fast operating memory cache temporarily storing limited codes and data that are frequently accessed to reduce the total access time to the main memory 16. The L2 cache is typically formed by a static RAM (SRAM) chip.

The CPU 14 is interconnected with hardware components, which will be described below, through three levels of bus: a FrontSide (FS) bus 18, which is a processor bus directly coupled to an external pin of the CPU 14 itself, a Peripheral Component Interconnect (PCI) bus 20, which is a fast I/O-device bus, and Industry Standard Architecture bus 22, which is a low-speed I/O-device bus.

The FS bus 18 and PCI bus 22 are coupled through a CPU bridge (host-PCI bridge), commonly known as a memory/PCI control chip. The CPU bridge 24 in the present embodiment contains a memory controller for controlling access operations to the main memory 16 and a data buffer for accommodating a difference between data transfer rate of the FS bus 18 and that of the PCI bus 20, and, for example, may be 440BX from Intel or other bridges.

The main memory 16 is a writable memory used as an area into which an execution program CPU14 is loaded or a working area in which data processed by the execution program is written. The main memory 16 is formed by a plurality of Dynamic RAM (DRAM) chips, for example.

As shown in FIG. 3, the term "execution programs" as used herein include WIN 32, which is an Application Program Interface (API), an operating system OS86 such as Windows98 or the like containing a kernel 82 performing a task management and a job management or the like and ACPI.SYS 84, which is a driver for performing processes relating to ACPI, various device drivers for manipulating hardware such as peripheral devices, application programs for specific tasks, and firmware including BIOS's such as ACPI BIOS 88 stored in flash ROM 72 for providing information to OS 86 and performing processes requested by the OS 86 in an ACPI environment.

Also, in this embodiment, there are included in the execution programs, as shown in FIG. 3 an event driver 90, which is a special driver associated with ACPI.SYS 84 provided by the OS 86 for extracting a system-specific event from the ACPI BIOS 88, and an event service 92, which is application-layer software for monitoring the operation of the system based on information from the event driver 90 and presenting information to a user and requesting the subsequent action of the system as required to OS 86.

The above-mentioned software, such as the OS 86, various device drivers, application programs, event driver 90, and event service 92, is typically stored on a hard disk drive (HDD) 46, read into the main memory 16 as necessary during the boot-up of the PC 12, and executed by the CPU 14.

The PCI bus 20 allows for relatively fast data transfer rate and coupled to which are PCI devices such as a card bus controller 30 that operate at a relatively high speed. The PCI architecture is an architecture introduced by Intel Corporation and provides the so-called "Plug and Play (PnP)" capability.

A video subsystem 26 is a subsystem for providing functions relating to video. It comprises a video controller which processes an image generation instruction provided by the CPU 14, writes the processed image generation information into video memory (VRAM), and reads image generation information from the VRAM to output it to a liquid crystal display (LCD) 28 (shown in FIG. 2) as image data. The video controller can convert a digital video signal into an analog video signal with a digital-analog converter (DAC) associated with it. The analog video signal is output to a CRT port (not shown) over a signal line.

Also connected to the PCI bus 20 are a card bus controller 30, an audio subsystem 32, a docking station interface (Dock I/F) 34, and a mini PCI slot 36. The card bus controller 30 is a special controller for directly coupling a bus signal on the PCI bus 20 to an interface connector (card bus) of a PCI card bus slot 38. The card slot 38 is provided, for example, on a wall of the main body of the PC 12 and holds a PC card 40 conforming to a specification developed by Personal Computer Memory Association (PCMCIA)/Japan Electronic Industry Development Association (JEIDA).

The Dock I/F 34 is hardware for connecting the PC 12 with a docking station 94. Once the PC 12 is set on the docking station, an internal bus in the docking station is connected to the Dock I/F 34 and various hardware components (for example, a DVD drive 96 in the docking station 94 shown in FIG. 2) coupled to the internal bus of the docking station are connected to the PCI bus 20 through the Dock I/F 34.

To remove the PC 12 from the docking station 94, an eject button 98 provided in the docking station 94 as shown in FIG. 2 is depressed. When this button is depressed, first a lock mechanism, which is not shown, works to prevent the PC 12 from being removed from the docking station 94. Then the OS 86 performs a pre-process for enabling the removal of the PC 12 from the docking station 94. After the pre-process is completed, the lock mechanism (not shown) is released, allowing for the removal.

Attached to the mini PCI slot 36 is, for example a network adapter 42 for connecting the computer system 10 to a network (for example, LAN).

The PCI bus 20 and the ISA bus 22 are interconnected through a PCI-ISA bridge 44. The PCI-ISA bridge 44 provides a bridge function between the PCI bus 20 and the ISA bus 22, a Direct Memory Access (DMA) controller function, Programmable Interruption Controller (PIC) function, a Programmable Interval Timer (PIT) function, Integrated Drive Electronics (IDE) interface function, a Universal Serial Bus (USB) function, and a System Management Bus (SMB) interface function, and includes a real time clock (RTC). The PCI-ISA bridge 44 may be PIIX4 chip from Intel Corporation, for example. The DMA controller function allows for data transfer between a peripheral device (for example, a floppy disk drive) and the main memory 16 without involvement by the CPU 14. The PIC function causes a predetermined program (interrupt handler) to be executed in response to an interrupt request (IRQ) from a peripheral device. The PIT function generates a timer signal at predetermined intervals, which are programmable.

The IDE hard disk drive (HDD) 46 is connected to an IDE interface implemented by the IDE interface function, and an IDE CD-ROM drive 48 is also connected to it through an AT Attachment Packet Interface (ATAPI). Instead of the IDE CD-ROM drive 48, other types of IDE devices, such as a DVD (Digital Video Disc or Digital Versatile Disc) drive, may be connected to the IDE interface. External storage devices such as the HDD 46 and the CD-ROM drive 48 are held in a space called a "swappable bay" in the main unit of the PC 12, for example. These standard external storage devices may be installed exclusively and exchangeable with other devices such as a floppy disk drive or a battery pack.

A USB port is provided in the PCI-ISA bridge 44. The USB port is connected to a USB connector 50 provided on a wall of the main unit of the PC 12, for example. The USB supports a capability allowing a new peripheral device (USB device) to be connected to or disconnected from an active system (hot plugging function) and a function for automatically recognizing a newly attached peripheral device and reconfiguring the system (plug and play function). Up to 63 USB devices can be daisy-chained to a single USB port. Examples of the USB device include a keyboard, mouse, joystick, scanner, printer, modem, display monitor, tablet, or the like.

EEPROM 94 is also connected to the PCI-ISA bridge 44 through an SM bus. The EEPROM 94 holds information such as a password registered by a user, a supervisor password, and a product serial number, and is non-volatile and the contents of which are electronically rewritable. The PCI-ISA bridge 44 is connected to a power supply circuit 54 through a shutdown reset logic 52. A power management section for managing the power supply status of the computer system 10 is provided within a core chip forming the PCI-ISA bridge 44.

The power management section and the power supply circuit 54 send and receive signals through the shutdown reset logic 52. The power management section of the PCI-ISA bridge 44 knows the actual state of power supplied from the power supply circuit to the computer system 10 by sending and receiving the signals and the power supply circuit 54 controls power supply to the computer system 10 according to an instruction from the power management section of the PCI-ISA bridge 44.

The ISA bus 22 provides a data transfer rate slower than that of the PCI bus 20 and is used for connecting a Super I/O controller 70, flash ROM 72 formed by EEPROM or the like, CMOS 74, and peripheral devices such as a keyboard/mouse controller (not shown) that operate at a relatively low speed.

An I/O port 78 is coupled to the Super I/O controller 70. The Super I/O controller 70 controls the drive of a floppy disk drive (FDD), the input/output of parallel data through a parallel port, and the input/output of serial data through a serial port.

The flash ROM 72 is a memory for holding various BIOS programs, which is non-volatile, and the content of which are electrically rewritable. The BIOS programs are written in the ACPI Source Language (ASL). The CMOS 74 consists of volatile semiconductor memory connected to a backup power source and acts as non-volatile, fast memory means.

To configure the computer system 10, many other electric circuits are required in addition to those shown in FIG. 1. However, they are well known to those skilled in the art and do not constitute the essential subject of the present invention, and therefore the description of which is omitted herein. In addition, only part of the connections between hardware blocks are shown in the drawings for simplicity.

Next, the operation of the present embodiment will be described below. The computer system 10 according to the present invention is a personal computer conforming to the ACPI standard and a plurality of power supply statuses (S0–S5, G3) are defined as its power supply status as shown in Table 1.

TABLE 1

| Power supply status | APM | Actual status | Condition for returning to S0 |
|---|---|---|---|
| S0 | Operational | Operational state | |
| S1 | Standby | Power to some of peripherals is shut off | Occurrence of a predetermined event |
| S2 | | | |
| S3 | Suspend | Operation status is stored in memory and power to peripherals is shut off | Occurrence of a predetermined event |
| S4 | Hibernation | Operation status is stored in HDD and power to most components is shut off | Occurrence of a predetermined event |
| S5 | Soft OFF | Power to all components except the power management section of the core chip is shut off | Power switch on |
| G3 | MechOFF | Power to all components including the power management section is shut off | Power switch on |

"APM" in Table 1 indicates the correspondence of power supply statuses S0–S5, G3 and those specified in the Advanced Power Management (APM) standard. In some cases, statuses S1–S3 may be collectively called "standby" and statuses S5 and G3 are collectively called "shutdown". In addition, statuses S1 to S4 are collectively called "sleep".

The operation when the eject button 98 on a docking station 94 is depressed with a PC 12 being attached to the docking station 94 during power supply statuses S1–S3 (standby status) will be describe below with reference to a flowchart shown in FIG. 4 as an example.

When a user depresses the eject button 98 on the docking station 94 shown in FIG. 2, a signal indicating the depression of the eject button 98 is provided from the docking station 94 to the computer system 10. This signal causes the CPU 14 to execute an ACPI BIOS 86. At the same time, a lock mechanism, which is not shown, works to prevent the PC 12 from being removed from the docking station 94.

When the ACPI BIOS 86 knows that the eject button 94 on the docking station 94 is depressed (step 100), it notifies an event driver 90 of the eject event (a second request event) (step 102). The event driver 90 straightforwardly notifies of an event service 92 of the event notified by the ACPI BIOS 86 (step 104). That is, the eject event is notified from the ACPI BIOS 86 to the event service 92 through the event driver 90.

This allows the event service 92 to know that the eject button 98 of the docking station 94 is depressed during suspend mode.

When the eject button 98 of the docking station 94 is depressed, a pre-process for allowing the PC 12 to be removed from the docking station 94 should be performed. That is, to perform this pre-process, the computer system 10 should be switched from the suspend sate to an operational state (power supply status S0) ("resuming").

To accomplish this, the ACPI BIOS 86 replaces the eject event with a wakeup request defined in the ACPI standard and notifies ACPI.SYS 84 in the OS 86 of the request (step 106). ACPI.SYS 84 then notifies a kernel 82 of the request. Thereby ACPI.SYS 84 switches the computer system 10 from the suspend state to its operational state (power supply status S0) under management of the kernel 82, that is, it causes the computer system 10 to resume its operation (step 108).

The ACPI BIOS 86 also notifies ACPI.SYS 84 of an undock request (request event) defined in the ACPI standard (step 110). ACPI.SYS 84 notifies the kernel 82 of the request. This causes ACPI.SYS 84 to perform a pre-process for allowing the PC 12 to be removed from the docking station 94 (step 112).

After the completion of this pre-process, the kernel 82 notifies the ACPI BIOS 86 of a request for releasing a lock mechanism (not shown), that is an undock request, through ACPI.SYS 84 (step 114). The ACPI BIOS 86, in response to this request, performs an undock process (step 116). That is, it releases the lock mechanism (not shown) to allow the PC 12 to be removed from the docking station 94.

After releasing the lock mechanism, the ACPI BIOS 86 notifies the event driver 90 of the completion of the undock process (intermediate event) (step 118). The event driver 90 notifies the event service 92 of the intermediate event (step 120).

After the event service 92 knows the completion of the undock process, it notifies the kernel 82 of a suspend request (additional event) in order to causes the computer to return from the operational state to the suspend state (step 122). The kernel 82 switches the computer from the operational state, that is, power supply status S0, to a suspend status, that is, any of power supply statuses S1–S3 (step 124).

The above-described operation is performed when the eject button 98 of the docking station 94 is depressed during power supply status S4 (hibernation) with the PC 12 being attached to the docking station 94.

In this way, if the eject button 98 on the docking station is depressed to remove the PC 12 from the PC 12 in suspend mode with the PC 12 being attached to the docking station 94, the PC 12 resumes operation but does not remain resuming operation resume, instead, returns to suspend state.

That is, the event service 92 provided in the application layer can monitor the operating state of the system based on information provided from the event driver 90 dedicated to extracting a system-specific event and request an operation from the OS 86 according to the operation status, thereby allowing a process that is not defined in the ACPI standard to be performed besides standard processes if a system-specific event as described above occurs. Therefore, the present invention can match the behavior of the PC 12 to the user's intent.

While the embodiment of present invention has been described with respect to the example in which a PC 12 is removed from a docking station 98, the present invention is not limited to this embodiment. The present invention can be applied to the case where a CD-ROM drive 48 held in a swappable bay in the main unit of a PC 12 is removed from the bay. Furthermore, the application of the present invention is not limited to the removal of a PC 12. The present invention can be applied to the case where a PC 12 in suspend mode is attached to a docking station 98, or where a CD-ROM drive 48 or the like is attached to a swappable bay of a PC 12 in suspend mode.

While again the present embodiment has been described with respect to the example in which the present invention is applied to a computer conforming to the ACPI standard, such as one running Windows 98, the present invention is not limited to this standard. The present invention can be applied broadly to computers the system of which is managed mainly by an operating system and which runs an operating system under which it is difficult to perform a specific process for a system-specific event. For example, the present invention can be applied to a computer running an operating system of Windows 98, such as Windows 2000, or subsequent Windows based or other operating systems, such as AIX or Linux.

What is claimed is:

1. A method for controlling a computer for a device event provided from hardware, in which said computer comprises a basic system for notifying an operating system of a request event corresponding to the device event in response to the device event from said hardware, accepting a response event of the operating system caused by the notification, and outputting a process event corresponding to the accepted response event to the hardware, said method comprising:

notifying said operating system of an additional event associated with the response event after receiving said response event in said basic system;

accepting an additional response event corresponding to said additional event from said operating system; and, outputting an additional process event corresponding to said accepted additional response event to said hardware, wherein said process event comprises an event for switching said computer from an energy-saving mode to a normal mode, and said additional process event comprises an event for switching said computer from said normal mode to the energy-saving mode after said process event is output.

2. The method according to claim 1, further comprising:

performing the notification of an intermediate event after accepting said response event and outputting said process event in said basic system;

accepting said intermediate event; and notifying said operating system of an additional event associated with said response event.

3. The method according to claim 1, wherein said basic system conforms to an ACPI standard.

4. The method according to claim 1, wherein said device event is an attach/detach event which is generated when the attachment/detachment of a peripheral device is indicated to said hardware during an energy-saving mode of said computer, and wherein said process event allows said peripheral device to be attached/detached from said computer.

5. The method according to claim 1, further comprising:

notifying said operating system of a second request event associated with said request event as well as said request event;

accepting said second request event and monitoring said process event;

notifying said operating system of an intermediate event after accepting said response event and outputting said process event;

accepting said intermediate event; and notifying said operating system of an additional event associated with said response event.

6. The method according to claim 1, wherein said method further comprises:

notifying said operating system of a second request event associated with said request event as well as said request event;

accepting said second request event and monitoring said process event;

notifying said operating system of an intermediate event after accepting said response event and outputting said process event;

accepting said intermediate event; and notifying said operating system of an additional event associated with said response event.

7. A computer comprising a basic system configured for notifying an operating system of a request event corresponding to a device event in response to the device event from hardware, accepting a response event of the operating system caused by the notification, and outputting a process event corresponding to the accepted response event to said hardware, wherein said basic system comprises:

a notifier configured for notifying said operating system of an additional event associated with said response event after receiving said response event;

an acceptor configured for accepting an additional response event corresponding to said additional event from said operating system; and an output unit configured for outputting an additional process event corresponding to said accepted additional response event to said hardware, wherein said process event comprises an event for switching said computer from an energy-saving mode to a normal mode, and said additional process event comprises an event for switching said computer from said normal mode to the energy-saving mode after said process event is output.

8. The computer according to claim 7, wherein said basic system further comprises:

a second notifier configured for performing the notification of an intermediate event after accepting said response event and outputting said process event; and a second acceptor configured for accepting said intermediate event.

9. The computer according to claim 7, wherein said basic system conforms to an ACPI standard.

10. The computer according to claim 7, wherein said device event is an attach/detach event which is generated when the attachment/detachment of a peripheral device is indicated to said hardware during energy-saving mode of said computer, and wherein said process event allows said peripheral device to be attached/detached from said computer.

11. The computer according to claim 8, wherein said basic system further comprises:

a third notifier configured for notifying said operating system of a second request event associated with said request event as well as said request event; and a monitor configured for accepting said second request event and monitoring said process event.

12. The computer according to claim 7, wherein said computer comprises any of a personal computer and a notebook computer.

13. A recording medium containing a program configured for performing a method for controlling a computer for a device event provided from hardware, in which said computer comprises a basic system for notifying an operating system of a request event corresponding to the device event in response to the device event from said hardware, accepting a response event of the operating system caused by the notification, and outputting a process event corresponding to the accepted response event to the hardware, said method comprising:

notifying said operating system of an additional event associated with said response event after receiving said response event in said basic system;

accepting an additional response event corresponding to said additional event from said operating system; and outputting an additional process event corresponding to said accepted additional response event to said hardware, wherein said process event comprises an event for switching said computer from an energy-saving mode to a normal mode, and said additional process event comprises an event for switching said computer from said normal mode to the energy-saving mode after said process event is output.

14. The recording medium according to claim 13, wherein said method further comprises:

performing the notification of an intermediate event after accepting said response event and outputting said process event in said basic system;

accepting said intermediate event; and notifying said operating system of an additional event associated with said response event.

15. The recording medium according to claim 13, wherein said basic system conforms to an ACPI standard.

16. The recording medium according to claim 13, wherein said device event is an attach/detach event which is generated when the attachment/detachment of a peripheral device as indicated to said hardware during an energy-saving mode of said computer, and wherein said process event allows said peripheral device to be attached/detached from said computer.

17. The recording medium according to claim 13, wherein said method further comprises:

notifying said operating system of a second request event associated with said request event as well as said request event;

accepting said second request event and monitoring said process event;

notifying said operating system of an intermediate event after accepting said response event and outputting said process event;

accepting said intermediate event; and notifying said operating system of an additional event associated with said response event.

18. The recording medium according to claim 13, wherein said method further comprises:

notifying said operating system of a second request event associated with said request event as well as said request event;

accepting said second request event and monitoring said process event;

notifying said operating system of an intermediate event after accepting said response event and outputting said process event;

accepting said intermediate event; and notifying said operating system of an additional event associated with said response event.

* * * * *